May 3, 1932. A. J. LAVOIE 1,856,284
DIVIDED TRANSVERSELY MOUNTED CHANGE SPEED FOR FRONT WHEEL DRIVES
Filed Sept. 15, 1930 3 Sheets-Sheet 2

Inventor
Alphonse J. Lavoie
By Blackmor, Spencer & Fish
Attorneys

May 3, 1932. A. J. LAVOIE 1,856,284

DIVIDED TRANSVERSELY MOUNTED CHANGE SPEED FOR FRONT WHEEL DRIVES

Filed Sept. 15, 1930  3 Sheets-Sheet 3

Inventor
Alphonse J. Lavoie
By Blackwood, Spencer & Flint
Attorneys

Patented May 3, 1932

1,856,284

UNITED STATES PATENT OFFICE

ALPHONSE JOSEPH LAVOIE, OF DETROIT, MICHIGAN, ASSIGNOR TO GENERAL MOTORS CORPORATION, OF DETROIT, MICHIGAN, A CORPORATION OF DELAWARE

DIVIDED TRANSVERSELY MOUNTED CHANGE SPEED FOR FRONT WHEEL DRIVES

Application filed September 15, 1930. Serial No. 481,931.

This invention relates to power transmission and particularly to a power transmission for driving the front wheels of a motor vehicle.

An object of the invention is to provide a very compact arrangement and to reduce the distance between the clutch and the final drive elements.

Another object is to so design such a transmission that it shall be rigid, and economical to manufacture.

Another and very important object is to provide for the convenient removability of the complete assembly, and also for the removability of separate sub-assemblies.

As a more specific object the invention aims to carry out the primary objects noted above by using gear trains constituting the transmission located partly on one side and partly on the other side of the longitudinal axis of the complete assembly.

Other objects and advantages will be understood from the following description.

In the drawings—

Figure 1:
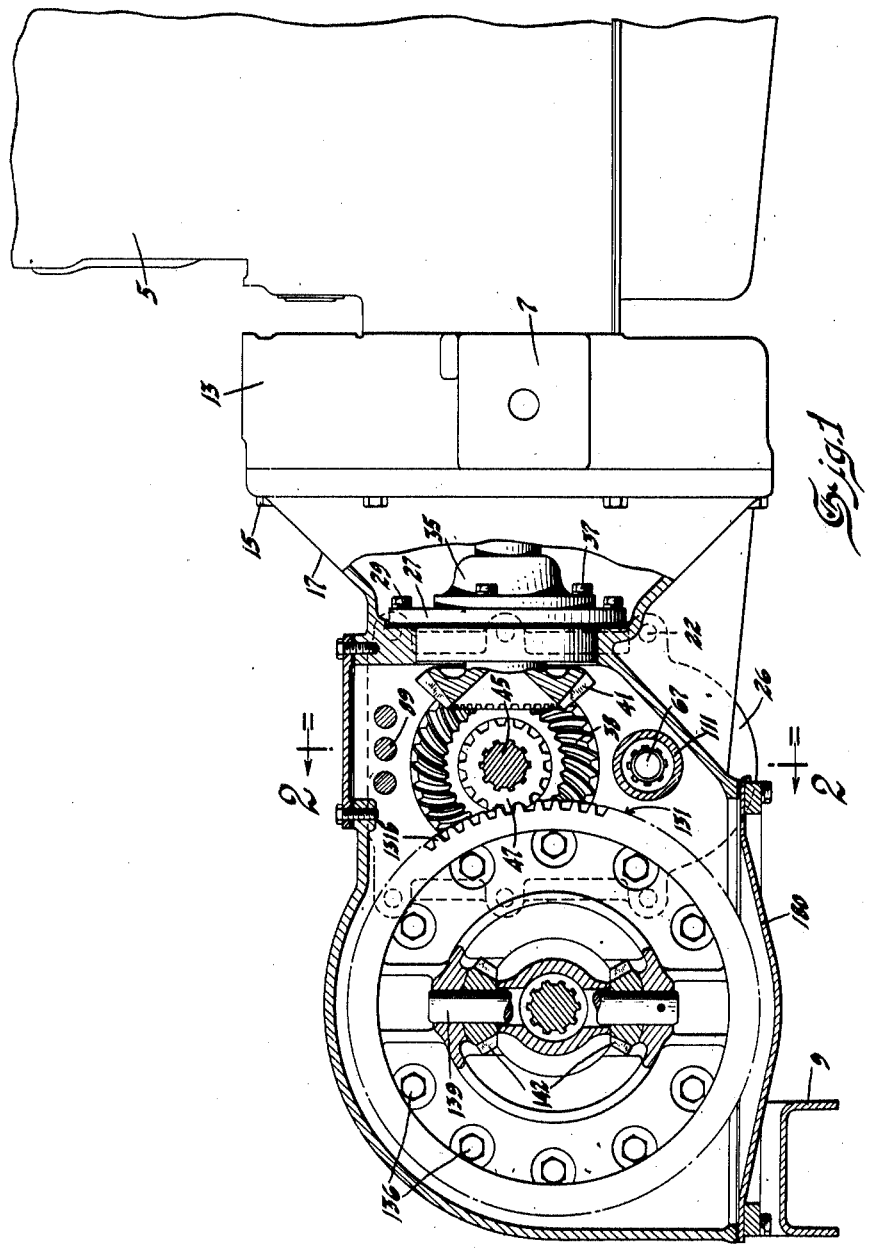
Fig. 1 is a view partly in side elevation and partly in vertical section of my novel transmission assembly.

Referring by reference characters to the drawings, numeral 5 is the power unit of the vehicle, preferably an internal combustion engine. This power unit is shown with fastening means 7 by which it is to be secured to the vehicle chassis. The chassis, adjacent its front end, has a cross member 9 to which the front end of the complete novel assembly is to be secured. Numeral 11 is used to represent the attachment of the transmission assembly to this cross member. To the clutch housing 13 located at the front end of the power unit, there is secured by fastening means 15 the rear portion of the transmission casing 17, this casing together with side gear housings 24 and 26 enclosing the assembly constituting the invention. This assembly includes a variable speed device, a differential carrier and wheel driving shafts.

It will be seen that by disconnecting means at 15 and at 11 the whole assembly may be removed.

Within the clutch housing 13 there will be located a clutch which may be of any preferred form, and for which no novelty is herein claimed. The shaft 25, driven by the clutch, extends longitudinally forward through a bearing ring 27, the latter secured by fastening means 29 to a reduced portion of housing 17. This ring member 27 has an inwardly directed flange 31 holding the forward end of the outer bearing race 33. The other end of this race is held by a projection on member 35 which projection engages the ring 27 and is secured thereto by fastening means 37. The member 35 has a portion of reduced diameter and provides a sliding bearing surface for the clutch collar 21. The inner race 39 is carried by shaft 25 between the hub portion of a terminal spiral bevelled gear 41 and suitable nuts 43 threaded on shaft 25.

Secured to the main transmission casing 17 by fastening means 22 are the gear housings 24 and 26. These gear housings have flanges surrounding openings in the main casing, as shown in the drawings, into which openings are received centering hubs 24' and 26' as illustrated. These hubs 24' and 26' carry aligned bearings 28 and 30, these bearings being substantially in the plane of the walls of the main casing.

A sleeve 32 rotates within bearing 30, said sleeve having a shoulder engaging the outer side of the inner bearing race. A spiral bevelled gear 38 is secured to sleeve 32 between threaded means 40, and the inner bearing race. The gear 38 is in driving engagement with the bevelled gear 41 as shown in the drawings. The outer race for bearing 30 on its inner face is held against a shoulder of hub 26' by an adjusting ring 42 in threaded engagement with the hub portion 26'.

Rotatably mounted within sleeve 32 and bearing 30 and extending through the main casing 17, and also through the side gear housings 24 and 26 is a shaft 45. This shaft may be called a propeller shaft since it carries, splined thereon, a pinion 47 for driving the ring gear of the differential gear unit. Shaft 45 is also journaled in a bearing 49 in the outer wall of gear housing 24, there being a removable cover 51. At the other end of shaft 45 is a bearing 53 within a ring 55 secured, together with a cover 57, by fastening means 59 to the outer wall of gear housing 26. Within the cover 57 the shaft 45 may be equipped with a driving gear 61 held between the inner bearing race of bearing 53 and a nut 63. This gear 61 is to drive a gear 65 of a speedometer drive shaft, the shaft being preferably journaled in the cover 57. By removing the cover 57 access is had to gear 61 for inspection or replacement.

Figure 2:
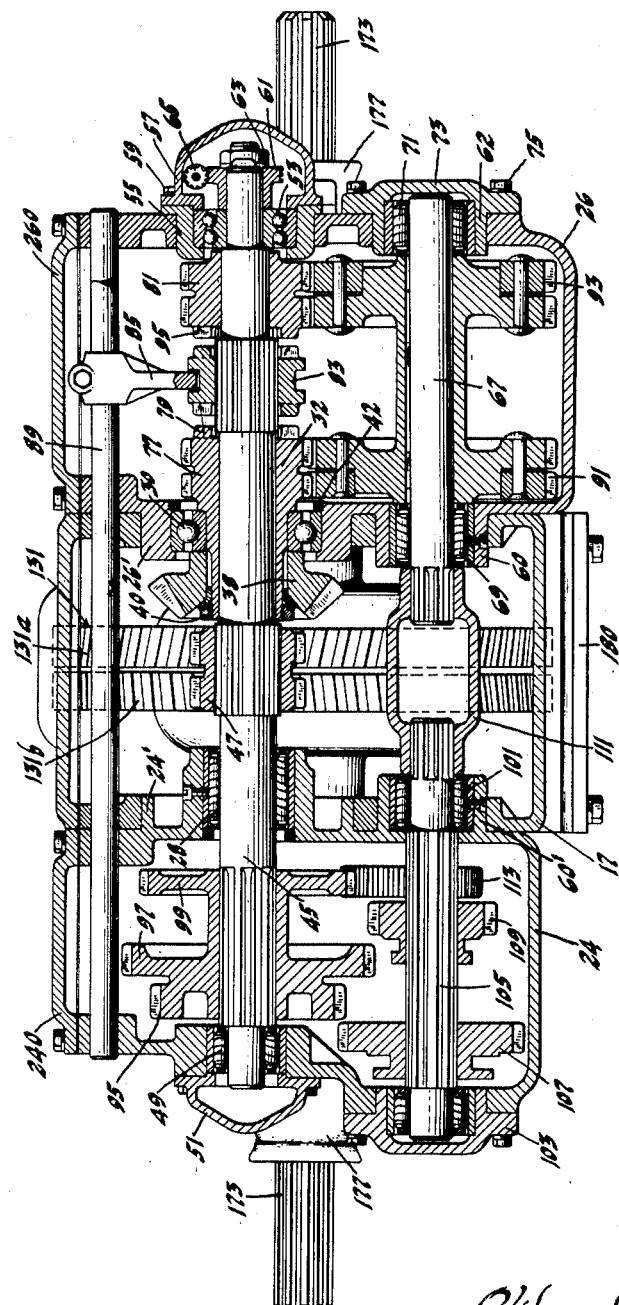
Fig. 2 is a transverse section through the transmission, the section being on line 2—2 of Fig. 1.
Figure 3:
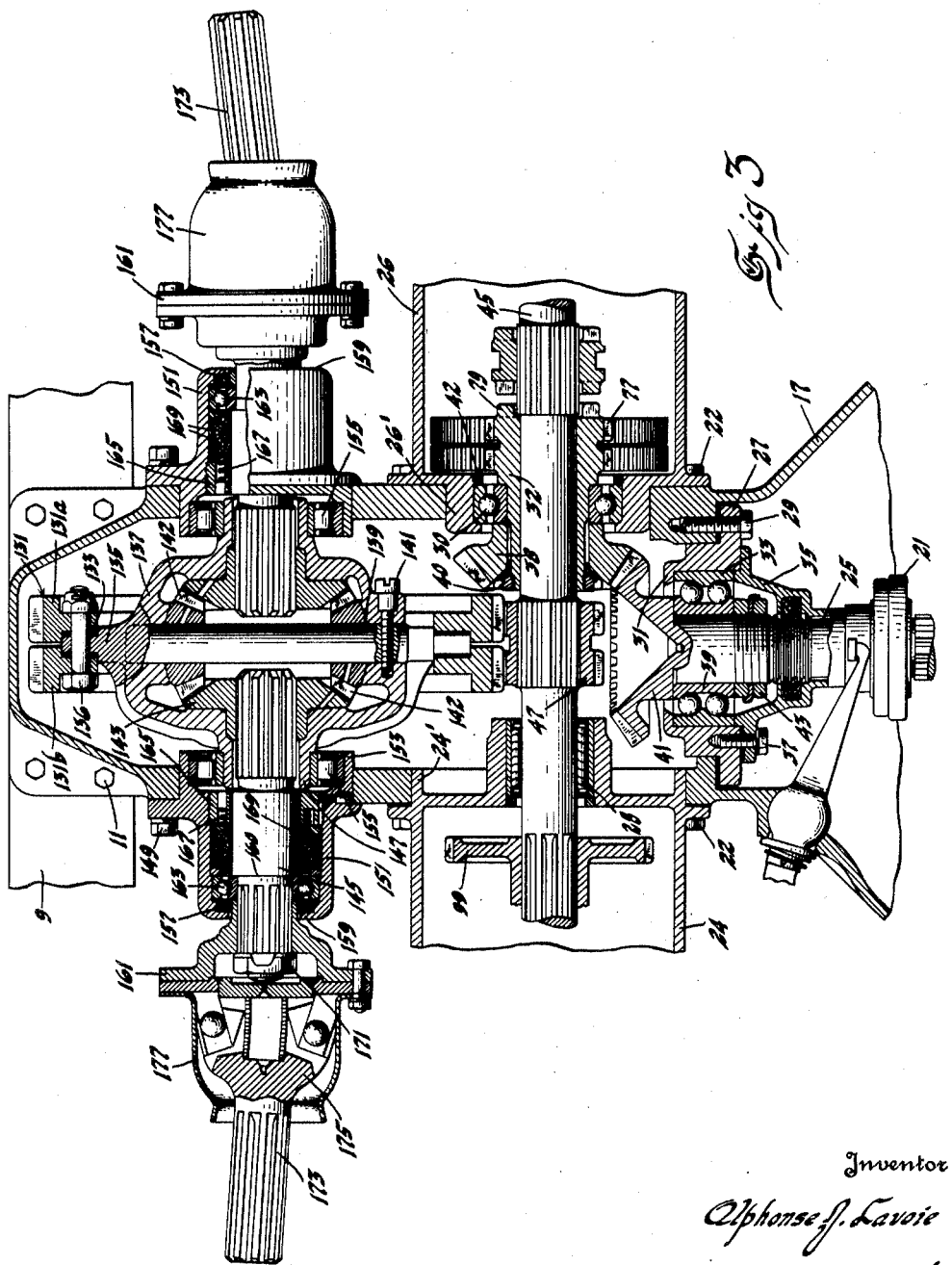
Fig. 3 is a horizontal section.

Gear housing 26 has an annular flange 60 below the annular hub 26'. This flange 60 is smaller than the hub 26' and is received within a second opening in casing 17 as shown in Fig. 2. A shaft 67 is journaled in flange 60, and in a bearing 71 carried by a flange 62 of a cover 73 secured by fastening means 75. It will be seen that this shaft 67 extends through the inner bearing 69 and into the main casing 17.

Integral with sleeve 32 is formed a gear 77, the gear 77 being within the gear housing 26 and on the opposite side of the bearing 30 from the bevelled gear 38. Axially of gear 77 there are clutch teeth 79. Rotatably on shaft 45 and adjacent the bearing within the ring 55 is a gear 81. Slidable on splines on shaft 45 between gears 77 and 81 is a double clutch 83 which is operated by a shift fork 85 carried by a shift rail 89. On the shaft 67 is rotatably mounted a sleeve carrying gears 91 and 93. Gear 91 is in constant mesh with gear 77 and gear 93 is in constant mesh with gear 81. When clutch 83 is moved to the left (Fig. 2) sleeve 32 driven by the meshing bevelled gears 41 and 38 is locked by the clutch to the shaft 45, so that the drive is in direct or highest speed. In the transmission herein shown, it will be fourth speed. Third speed is secured by sliding clutch 83 into engagement with teeth 95 of gear 81. The drive is then through the bevelled gears, the gear trains 77 and 91 and the gear train 93 and 81 to the shaft 45 through the instrumentality of the clutch 83.

Within casing 24 shaft 45 carries splined thereon a triple gear element with gears 95, 97, and 99. Casing 24 has a second annular flange 60' corresponding to flange 60 of casing 26. The flange 60' is received within another opening in casing 17. Journaled within bearings in flange 60' and in bearings carried by cap 103 secured to casing 24 is a shaft 105. This shaft extends through bearing 101 of flange 60' to a position adjacent the inner end of shaft 67. A coupling 111 engages splines on the ends of shafts 67 and 105, whereby both shafts are driven in unison, but either may be removed from the other owing to the axial sliding relation with the coupling. Splined for sliding on shaft 105 are gears 107 and 109. If gear 107 is shifted by a suitable shift fork (not shown) into engagement with gear 95, shaft 45 will be driven in second speed. The drive will be through gear train 77, 91 and gear train 107, 95. For low speed gear 109 is moved into mesh with gear 97. Fig. 2 shows a gear 113 in constant mesh with gear 99. If gear 109 is moved into mesh with gear 113 shaft 45 is then driven in reverse.

Pinion 47 drives ring gear 131 of the differential. This ring gear 131 is composed of two parts, 131a and 131b forming a herringbone gear. A ring of lead 133 is carried between each part, and a flange 135 on a differential carrier 137. Fastening means 136 serve to hold the parts together.

The carrier has a pin 139 held by fastening means 141. About the pin 139 rotate the usual bevelled pinions 142 meshing with other bevelled pinions 143, slidably splined on the ends of shafts 145 and rotatably mounted within the carrier 137. The carrier 137 has on each side an annular flange 147 surrounding and spaced from the splined portion of shaft 145. Secured to the main housing, as by fastening means 149 one on each side of the housing, are bearing supports 151 for the rotatable support of shafts 145. These bearing supports 151 have internal flanges 153. Between the flanges 153 and 147 are antifriction bearings 155, the outer race with the rollers carried by the flange 153 and the inner race by flange 147. It will be seen that the differential carrier 137 is supported in a floating manner by the bearings 155 within the inner ends 153 of the bearing supports 151.

The support 151 encloses a packing ring 157 between itself and a flange 159 at the inner end of a universal joint member 161. A ball bearing 163 is located within the bearing support 151 adjacent the packing 157, its inner race engaging a shoulder 160 on the shaft 45 and also the inner end of the member 161, whereby no relative axial movement is possible between the shaft 145 and the member 161 when the fastening nut 171 is secured in position. On the inner end of the bearing support 151 is threaded a closure cap 165 having axial openings to receive springs 167 which act against a suitable assembly of packings 169 as shown. Shafts 173 are coupled to members 161, carried by shafts 145 by a suitable universal joint 175. As to this joint no novelty is herein claimed. The joint is preferably provided with a protecting cover 177. Shaft 173 is shown as splined, the spline being intended for a slidable connection with a driving member associated with the front wheels.

It will be seen that access is had to the gearing within casings 24 and 26 by the provision of removable covers 240 and 260. There is also a removable cover 180 through which the differential unit may be removed when the fastening means 149 have been detached and the bearing supports together with shafts 145 moved outwardly.

The fastening means for the gear housing 24 may be detached and the housing 24 removed. In the case of such removal the shaft 105 remains with the housing, its inner end separating from the coupling 111. The shaft 45 separates from the bearings provided for in the gear housing 24, the gears 95, 97, and 99 sliding off the shaft 45 as the gear housing 24 is removed. If it be desired to remove gear housing 26 the fastenings are detached and the housing may be readily removed. In such removal shaft 67 separates from the coupling 111 in an obvious manner. The shaft 45 is removed with this housing 26. As it is being removed the pinion 47 will be held in position by its engagement with the herringbone ring gear and the shaft will slide through the pinion. In the event that the differential unit may have been first removed, the pinion 47 will then be carried out of the main casing 17 with shaft 45 when gear housing 26 is being removed.

The construction described provides for a transmission having four forward speeds and one in reverse of a very compact design. The whole assembly may readily be removed. The differential assembly is easily removed without disturbing any of the other parts. The sub-assembly including the gear trains for low speed and reverse is easily removed from the main casing. Also, the gear housing for the speeds affording the higher ratio drive is readily disassembled. The distance from the bevel drive gear adjacent the clutch to the ring gear of the differential is reduced to a minimum, and that too where the transmission is equipped with four forward speeds. This is made possible by the division of the transmission into two parts, one located on either side of the longitudinal axis of the main assembly.

Other advantages not specifically enumerated will be apparent upon examination of the drawings.

I claim:

1. In power transmission mechanism, a drive shaft, a propeller shaft, said shafts positioned in a substantially right angular relation, other aligned shafts parallel with said propeller shaft and one adjacent each end thereof, a coupling between the adjacent ends of said other shafts, driving means between said driving shaft and said other shafts, selective change speed gearing between each of said other shafts and said propeller shaft, a pinion carried by said propeller shaft, axles, and a differential connecting said pinion and said axles.

2. The invention set forth in claim 1, said driving means including optionally engageable means to drive said propeller shaft from said driving shaft independently of said change speed gearing.

3. In power transmission mechanism, a main casing, a longitudinal driving shaft journaled therein, independently removable gear housings secured one on each side of the main casing, a transversely arranged propeller shaft, aligned bearings therefor in each of said other casings, other shafts positioned in alignment and parallel to said propeller shaft, one of said other shafts being rotatably supported in each of said other gear housings, a coupling between the adjacent ends of said other shafts, one or more selective gear trains in each of said other housings for driving the propeller shaft from the said other shaft therein, and means to drive said other shafts.

4. The invention defined by claim 3, said last named means including a gear element on the drive shaft, a second gear element meshing therewith and rotatably mounted on the propeller shaft, a third gear element rigidly connected with the second gear element and located within one of said other housings, and a driven gear on one of said other shafts in mesh with said third gear element.

5. The invention defined by claim 3, said last named means including a gear element on the drive shaft, a second gear element meshing therewith and rotatably mounted on the propeller shaft, a third gear element rigid with the second gear element and located within one of said other housings, a driven gear on one of said other shafts and in mesh with said third gear, together with means to clutch said combined second and third gears in non-rotative relation to the propeller shaft.

6. In combination, a main transmission casing, a longitudinally arranged shaft journaled therein, said main casing having aligned side openings, other removable housings one secured to each side of said main casing, said other housings having annular hubs piloted within said side openings, sets of aligned bearings in each of said other housings, one bearing of each set being in a hub, a propeller shaft journaled in said bearings, other aligned shafts parallel with the propeller shaft and journaled one in each of said other housings, a separable coupling between the adjacent ends of said other shafts, said coupling being located in the main casing, gearing to drive said other coupled shafts, and selective gearing in each of said other housings to drive the propeller shaft from said other shafts.

7. The invention defined by claim 6, together with a pinion slidably splined on the propeller shaft and located in the main casing and a differential gear carrier unit also in said main casing and having a ring gear in mesh with said pinion.

8. The invention defined by claim 6, together with a pinion slidably splined on the propeller shaft within the main casing, a differential gear carrier also in said main casing and having a ring gear in mesh with said pinion, and wheel driving shafts extending laterally from opposite sides of said main casing, shaft supports therefor secured to said main casing, said differential gear carrier rotatably supported by said shaft supports.

9. In a transmission mechanism, a main casing, a longitudinal driving shaft entering one end of said casing and having a driving gear thereon, aligned wheel driving shaft supports secured at opposite sides of said main casing adjacent the opposite end thereof, a differential carrier within said casing adjacent the second mentioned end and rotatably supported by said shaft supports, gear housings one secured to each side of said main casing between the ends thereof, a transversely arranged propeller shaft journaled in aligned bearings in both said gear housings, a pinion on said propeller shaft in said main casing, said pinion being in geared engagement with said differential carrier, other shafts parallel with said propeller shaft one in each of said gear housings, a coupling in said main casing between the adjacent ends of said other shafts, means including a driven gear rotatably mounted on the propeller shaft, said driven gear engaging said driving gear and gearing between said driven gear and one of said other shafts, whereby said other shafts are driven, selective gearing in each of said gear housings between the said other shaft therein and said propeller shaft.

10. The invention defined by claim 9, together with means to clutch said driven gear to said propeller shaft.

11. The invention defined by claim 9, together with means to clutch said driven gear to the propeller shaft, and means to independently and removably secure each of said gear housings to the main casing.

12. In transmission mechanism, a main casing, a longitudinal driving shaft journaled therein, gear housings removably secured to said main casing one at each side thereof, a propeller shaft transversely arranged extending through the main casing and journaled in both said gear housings, other shafts parallel with said propeller shaft and journaled one in each of said gear housings, driving means to drive the other shafts from said longitudinal shaft, and selective gearing between said other shafts and said propeller shaft.

13. In combination, a main transmission casing, a longitudinal driving shaft journaled therein, a driving gear on said shaft, said casing having side apertures, gear housings removably secured one on each side of said main casing, said gear housings having hubs centered within said openings, sets of aligned bearings in each of said gear housings, one bearing of each set being within a housing hub, a transverse propeller shaft journaled in said bearings, a driven gear in mesh with said driving gear and rotatably mounted about the said propeller shaft within the main casing adjacent one hub bearing, a third gear rigidly connected to the driven gear and located on the other side of said bearing and within one of said gear housings, other shafts one in each gear housing and parallel with said propeller shaft, a coupling between the adjacent ends of said other shafts, a gear on one of said other shafts in engagement with said third gear whereby said other shafts are driven, and selective gearing between said other shafts and the propeller shafts in each of said gear casings.

14. The invention defined by claim 13, together with a differential driving pinion splined on said propeller shaft within said main casing, whereby the propeller shaft may be removed with that gear housing associated with the driving means for the other shafts.

In testimony whereof I affix my signature.
ALPHONSE JOSEPH LAVOIE.